United States Patent
Lithoxoos et al.

(10) Patent No.: US 10,662,061 B1
(45) Date of Patent: May 26, 2020

(54) TWO-STAGE ADSORPTION PROCESS FOR CLAUS TAIL GAS TREATMENT

(71) Applicant: SAUDI ARABIAN OIL COMPANY, Dhahran (SA)

(72) Inventors: Georgios Lithoxoos, Dhahran (SA); Yuguo Wang, Dhahran (SA); Rashid Othman, Khobar (SA)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 16/545,742

(22) Filed: Aug. 20, 2019

(51) Int. Cl.
*C01B 17/16* (2006.01)
*B01D 53/04* (2006.01)
*B01D 53/26* (2006.01)

(52) U.S. Cl.
CPC ........ *C01B 17/167* (2013.01); *B01D 53/0423* (2013.01); *B01D 53/265* (2013.01);
(Continued)

(58) Field of Classification Search
CPC . C01B 17/04; C01B 17/0404; C01B 17/0408; C01B 17/0452; C01B 17/0456; C01B 17/164; B01D 53/02; B01D 53/04; B01D 53/48; B01D 53/52; B01D 53/526; B01D 53/8603; B01D 2257/102;
(Continued)

(56) References Cited

U.S. PATENT DOCUMENTS 3,712,027 A   1/1973  Hasz
4,016,180 A   4/1977  Baierl
(Continued)

FOREIGN PATENT DOCUMENTS

CN    101519192 B    2/2011
CN    2013196520 U   9/2013
(Continued)

OTHER PUBLICATIONS

Mobatec, H2SO4 Double Adsorption Plant Process Model, Retrieved on May 17, 2019 from: https://www.mobatec.nl/web/products/process-models/h2so4-double-adsorption-plant/, 2 pages.
(Continued)

*Primary Examiner* — Timothy C Vanoy
(74) *Attorney, Agent, or Firm* — Bracewell LLP; Constance Gall Rhebergen

(57) ABSTRACT

Embodiments of the disclosure provide a method and a Claus tail gas treatment system for sulfur recovery. A tail gas stream is fed to a hydrogenation reactor to produce a hydrogenated gas stream by converting sulfur-containing compounds to hydrogen sulfide. The hydrogenated gas stream is fed to a quench tower to produce a quenched gas stream by condensing and recovering liquid water via a water condensate stream. The quenched gas stream is fed to a first stage adsorption unit to produce a first outlet gas stream by separating water via a first byproduct stream from hydrogen sulfide, carbon dioxide, and nitrogen. The first outlet stream is fed to a second stage adsorption unit to produce a second outlet gas stream by separating carbon dioxide and nitrogen via a second byproduct stream. The second outlet stream includes hydrogen sulfide. The second outlet stream can be fed to a Claus unit.

30 Claims, 6 Drawing Sheets

(52) U.S. Cl.
CPC ...... *C01B 17/162* (2013.01); *B01D 2253/108* (2013.01); *B01D 2253/116* (2013.01); *B01D 2257/102* (2013.01); *B01D 2257/504* (2013.01); *B01D 2257/80* (2013.01); *B01D 2259/403* (2013.01); *B01D 2259/40086* (2013.01)

(58) Field of Classification Search
CPC ........ B01D 2257/504; B01D 2257/304; B01D 2257/80; C10L 3/103
See application file for complete search history.

(56) References Cited

U.S. PATENT DOCUMENTS

| | | | |
|---|---|---|---|
| 4,291,003 A * | 9/1981 | Batteux | B01D 53/48 423/228 |
| 4,311,683 A | 1/1982 | Hass et al. | |
| 4,919,912 A * | 4/1990 | Taggart | C01B 17/0404 423/222 |
| 5,071,449 A | 12/1991 | Sircar | |
| 6,402,813 B2 | 6/2002 | Monereau et al. | |
| 6,403,051 B1 * | 6/2002 | Keller | C01B 3/386 423/245.1 |
| 7,311,891 B2 | 12/2007 | Dolan et al. | |
| 7,604,684 B2 | 10/2009 | Menzel | |
| 7,842,264 B2 | 11/2010 | Cooper et al. | |
| 8,361,200 B2 | 1/2013 | Sayari et al. | |
| 8,524,184 B2 | 9/2013 | Lyengar et al. | |
| 10,040,051 B2 * | 8/2018 | Weiss | B01D 53/75 |
| 2002/0023538 A1 | 2/2002 | Agarwal et al. | |
| 2006/0150812 A1 * | 7/2006 | Mak | B01D 53/1406 95/199 |
| 2011/0185896 A1 | 8/2011 | Sethna et al. | |
| 2013/0022534 A1 * | 1/2013 | Menzel | B01D 53/1418 423/576.8 |
| 2017/0190574 A1 | 7/2017 | Ercan et al. | |
| 2017/0216812 A1 * | 8/2017 | Weiss | B01D 53/1462 |
| 2018/0222822 A1 | 8/2018 | Van Wagensveld et al. | |

FOREIGN PATENT DOCUMENTS

| | | |
|---|---|---|
| CN | 204502749 U | 7/2015 |
| CN | 105688622 B | 8/2018 |

OTHER PUBLICATIONS

Wahedi, et al. "Economic assessment of Temperature Swing Adsorption systems as Claus Tail Gas Clean Up Units", Chemical EngineeringScience, 126(2015)186-195.

* cited by examiner

TWO-STAGE ADSORPTION PROCESS FOR CLAUS TAIL GAS TREATMENT

BACKGROUND

Field of the Disclosure

Embodiments of the disclosure generally relate to sulfur recovery. More specifically, embodiments of the disclosure relate to system and method for recovering hydrogen sulfide from a Claus tail gas.

Description of the Related Art

Sulfur recovery typically refers to the conversion of hydrogen sulfide to elemental sulfur. Hydrogen sulfide is a byproduct of processing natural gas and refining sulfur-containing crude oils. The conventional method of sulfur recovery is the Claus process. Approximately 90 percent (%) to 95% of recovered sulfur is produced by the Claus process. A conventional Claus process can recover between 95% and 98% of the hydrogen sulfide.

The conventional Claus process includes a thermal combustion stage and a catalytic reaction stage. In terms of equipment, the Claus unit (or Claus plant) includes a thermal reactor and two or three catalytic reactors (or Claus converters). Typical sulfur recovery efficiency for Claus units with two Claus converters is between 90% and 97%, and for a Claus unit with three Claus converters is between 95% and 98%. But there is increasing demand to achieve higher sulfur removal and recovery efficiency due to tight emissions regulations. Recent environmental regulations regarding sulfur oxides ($SO_x$) emissions place a stringent requirement on commercial sulfur recovery and accordingly, most countries require sulfur recovery efficiency in the range of 98.5% to 99.9%, or higher.

The addition of a tail gas treatment unit (TGTU) can increase sulfur recovery to or above 99.9%, but requires complex and expensive equipment. The TGTU entails either an add-on unit at the end of the Claus unit or a modification to the Claus unit itself. The add-on TGTU at the end of the Claus unit is generally used when the Claus process includes two Claus converters. Although there are several varieties of tail gas treatment technologies, they can be grouped into the following four broad categories: sub-dew point Claus process, direct oxidation of hydrogen sulfide to sulfur, sulfur dioxide reduction and recovery of hydrogen sulfide, and hydrogen sulfide combustion to sulfur dioxide and recovery of sulfur dioxide.

Sub-dew point Claus processes are processes based on a Claus converter performing at temperatures lesser than the sulfur dew point (lesser temperature is desirable due to equilibrium nature of the Claus catalytic reaction). Sub-dew point processes provide high equilibrium conversions in one catalyst bed, but are complicated by the need for periodic catalyst regeneration by sulfur evaporation at elevated temperatures. To accommodate for regeneration, such processes are usually performed in two or three (or even more) parallel reactors, periodically undergoing reaction and regeneration. Cold-bed-adsorption (CBA) is the most efficient sub-dew point process and can achieve 99% sulfur recovery.

Processes involving direct oxidation of hydrogen sulfide to sulfur are based on selective oxidation of hydrogen sulfide by oxygen to elemental sulfur using selective catalysts.

TGTU technology based on sulfur dioxide reduction and recovery of hydrogen sulfide involves the catalytic hydrogenation of leftover sulfur species to hydrogen sulfide, absorption of the hydrogen sulfide with amine solution and then recycling the hydrogen sulfide back to the Claus furnace.

TGTU technology based on hydrogen sulfide combustion to sulfur dioxide and recovery of sulfur dioxide involves the combustion of leftover hydrogen sulfide in the tail gas stream to sulfur dioxide, absorption of sulfur dioxide with a solvent (wet scrubbing), and recycling the sulfur dioxide back to the feed to Claus unit. Although sulfur dioxide scrubbing, also known as flue gas scrubbing, has not been commercially tested as a TGTU, the technology has been extensively used as flue gas scrubbing for coal based power stations.

SUMMARY

Embodiments of the disclosure generally relate to treating casing-casing annulus pressure. More specifically, embodiments of the disclosure relate to system and method for treating casing-casing annulus pressure using galvanic deposition.

Embodiments of the disclosure provide a method for sulfur recovery. The method includes the step of feeding a tail gas stream to a hydrogenation reactor to produce a hydrogenated gas stream by converting sulfur-containing compounds to hydrogen sulfide. The tail gas stream includes a Claus tail gas including the sulfur-containing compounds. The hydrogenated gas stream includes hydrogen sulfide, water, and at least one of: carbon dioxide and nitrogen. The hydrogenated gas stream is in the absence of the sulfur-containing compounds other than hydrogen sulfide. The method includes the step of feeding the hydrogenated gas stream to a quench tower to produce a quenched gas stream by condensing and recovering liquid water via a water condensate stream. The quenched gas stream includes hydrogen sulfide and at least one of: water, carbon dioxide, and nitrogen. The method includes the step of feeding the quenched gas stream to a first stage adsorption unit to produce a first outlet gas stream by separating water via a first byproduct stream from hydrogen sulfide, carbon dioxide, and nitrogen. The first outlet gas stream includes hydrogen sulfide and at least one of: carbon dioxide and nitrogen. The first outlet gas stream is in the absence of water. The method includes the step of feeding the first outlet gas stream to a second stage adsorption unit to produce a second outlet gas stream by separating carbon dioxide and nitrogen via a second byproduct stream. The second outlet gas stream includes hydrogen sulfide. The second outlet gas stream is in the absence of carbon dioxide and nitrogen.

In some embodiments, the method further includes the step of heating the tail gas stream to a first temperature ranging between 240° C. and 260° C. In some embodiments, the method further includes the step of cooling the quenched gas stream to a second temperature ranging between 15° C. and 30° C. In some embodiments, the method further includes the step of cooling the first outlet gas stream to a third temperature ranging between 15° C. and 30° C.

In some embodiments, the first stage adsorption unit includes at least three first adsorption vessels fluidly connected in parallel such that a continuous flow of the first outlet gas stream is provided by having one of the at least three first adsorption vessels in an adsorption cycle, one of the at least three first adsorption vessels in a regeneration cycle, and one of the at least three first adsorption vessels in a standby cycle.

In some embodiments, the first stage adsorption unit includes a first adsorption vessel including a first adsorbent.

The first adsorbent adsorbs hydrogen sulfide, carbon dioxide, and nitrogen while passes water to form the first byproduct stream during an adsorption cycle. In some embodiments, the first adsorbent includes an all-silica zeolite having a framework of a Zeolite Socony Mobil-5 (ZSM-5 or MFI) type or a Chabazite (CHA) type. In some embodiments, the method further includes the step of introducing an air feed to the first stage adsorption unit during a regeneration cycle such that hydrogen sulfide, carbon dioxide, and nitrogen desorbs from the first adsorbent to form the first outlet gas stream.

In some embodiments, the first stage adsorption unit includes a first adsorption vessel including a first adsorbent. The first adsorbent adsorbs water while passes hydrogen sulfide, carbon dioxide, and nitrogen to form the first outlet gas stream during an adsorption cycle. In some embodiments, wherein the first adsorbent includes a hydrophilic 3Å molecular sieve. In some embodiments, the method further includes the step of introducing an air feed to the first stage adsorption unit during a regeneration cycle such that water desorbs from the first adsorbent to form the first byproduct stream.

In some embodiments, the second stage adsorption unit includes at least three second adsorption vessels fluidly connected in parallel such that a continuous flow of the second outlet gas stream is provided by having one of the at least three second adsorption vessels in an adsorption cycle, one of the at least three second adsorption vessels in a regeneration cycle, and one of the at least three second adsorption vessels in a standby cycle.

In some embodiments, the second stage adsorption unit includes a second adsorption vessel including a second adsorbent, wherein the second adsorbent adsorbs hydrogen sulfide while passes carbon dioxide and nitrogen to form the second byproduct stream during an adsorption cycle. In some embodiments, the second adsorbent includes a zeolite having a framework of an MFI type, a CHA type, a Faujasite (FAU) type, a Mordenite (MOR) type, a Deca-dodecasil 3R (DDR) type, a Ferrierite (FER) type, or a Mobil Composition of Matter-22 (MCM-22 or MWW) type. The second adsorbent includes a zeolite having a metal organic framework (MOF) or a zeolite imidazolate framework (ZIF). In some embodiments, the method further includes the step of introducing an air feed to the second stage adsorption unit during a regeneration cycle such that hydrogen sulfide desorbs from the second adsorbent to form the second outlet gas stream.

In some embodiments, the method further includes the step of feeding the second outlet gas stream to a Claus unit.

Embodiments of the disclosure also provide a Claus tail gas treatment system for sulfur recovery. The Claus tail gas treatment system includes a hydrogenation reactor, a quench tower, a first stage adsorption unit, and a second stage adsorption unit. The hydrogenation reactor is configured to receive a Claus tail gas and to convert sulfur-containing compounds to hydrogen sulfide such that a hydrogenated gas stream is produced. The Claus tail gas includes the sulfur-containing compounds. The hydrogenated gas stream includes hydrogen sulfide, water, and at least one of: carbon dioxide and nitrogen. The hydrogenated gas stream is in the absence of the sulfur-containing compounds other than hydrogen sulfide. The quench tower is fluidly connected downstream of the hydrogenation reactor to receive the hydrogenated gas stream. The quench tower is configured to condense and recover liquid water via a water condensate stream and to produce a quenched gas stream. The quenched gas stream includes hydrogen sulfide and at least one of: water, carbon dioxide, and nitrogen. The first stage adsorption unit is fluidly connected downstream of the quench tower to receive the quenched gas stream. The first stage adsorption unit is configured to separate water via a first byproduct stream from hydrogen sulfide, carbon dioxide, and nitrogen to produce a first outlet gas stream. The first outlet gas stream includes hydrogen sulfide and at least one of: carbon dioxide and nitrogen. The first outlet gas stream is in the absence of water. The second stage adsorption unit is fluidly connected downstream of the first stage adsorption unit to receive the first outlet gas stream. The second stage adsorption unit is configured to separate carbon dioxide and nitrogen via a second byproduct stream to produce a second outlet gas stream. The second outlet gas stream includes hydrogen sulfide. The second outlet gas stream is in the absence of carbon dioxide and nitrogen.

In some embodiments, the Claus tail gas treatment system further includes a heater. The heater is fluidly connected upstream of the hydrogenation reactor. The heater is configured to heat the Claus tail gas to a first temperature ranging between 240° C. and 260° C. In some embodiments, the Claus tail gas treatment system further includes a first cooler. The first cooler is fluidly connected downstream of the quench tower and fluidly connected upstream of the first stage adsorption unit. The first cooler is configured to cool the quenched gas stream to a second temperature ranging between 15° C. and 30° C. In some embodiments, the Claus tail gas treatment system further includes a second cooler. The second cooler is fluidly connected downstream of the first stage adsorption unit and fluidly connected upstream of the second stage adsorption unit. The second cooler is configured to cool the first outlet gas stream to a third temperature ranging between 15° C. and 30° C.

In some embodiments, the first stage adsorption unit and the second stage adsorption unit are configured to receive an air feed during a regeneration cycle to desorb molecules adsorbed to an adsorbent in an adsorption cycle.

In some embodiments, the first stage adsorption unit includes at least three first adsorption vessels fluidly connected in parallel such that a continuous flow of the first outlet gas stream is provided by having one of the at least three first adsorption vessels in an adsorption cycle, one of the at least three first adsorption vessels in a regeneration cycle, and one of the at least three first adsorption vessels in a standby cycle.

In some embodiments, the first stage adsorption unit includes a first adsorption vessel including a first adsorbent. The first adsorbent is configured to adsorb hydrogen sulfide, carbon dioxide, and nitrogen while passing water to form the first byproduct stream during an adsorption cycle. In some embodiments, the first adsorbent includes an all-silica zeolite having a framework of MFI or CHA.

In some embodiments, the first stage adsorption unit comprises a first adsorption vessel including a first adsorbent. The first adsorbent is configured to adsorb water while passing hydrogen sulfide, carbon dioxide, and nitrogen to form the first outlet gas stream during an adsorption cycle. In some embodiments, the first adsorbent includes a hydrophilic 3Å molecular sieve.

In some embodiments, the second stage adsorption unit includes at least three second adsorption vessels fluidly connected in parallel such that a continuous flow of the second outlet gas stream is provided by having one of the at least three second adsorption vessels in an adsorption cycle, one of the at least three second adsorption vessels in a regeneration cycle, and one of the at least three second adsorption vessels in a standby cycle.

In some embodiments, the second stage adsorption unit includes a second adsorption vessel including a second adsorbent. The second adsorbent is configured to adsorb hydrogen sulfide while passing carbon dioxide and nitrogen to form the second byproduct stream during an adsorption cycle. In some embodiments, the second adsorbent includes a zeolite having a framework of an MFI type, a CHA type, an FAU type, an MOR type, a DDR type, an FER type, an MWW type, an MOF type, or a ZIF type.

In some embodiments, the second outlet gas stream is fluidly connected upstream of a Claus unit.

BRIEF DESCRIPTION OF THE DRAWINGS

So that the manner in which the previously-recited features, aspects, and advantages of the embodiments of this disclosure as well as others that will become apparent are attained and can be understood in detail, a more particular description of the disclosure briefly summarized previously may be had by reference to the embodiments that are illustrated in the drawings that form a part of this specification. However, it is to be noted that the appended drawings illustrate only certain embodiments of the disclosure and are not to be considered limiting of the disclosure's scope as the disclosure may admit to other equally effective embodiments.

Figure 1:
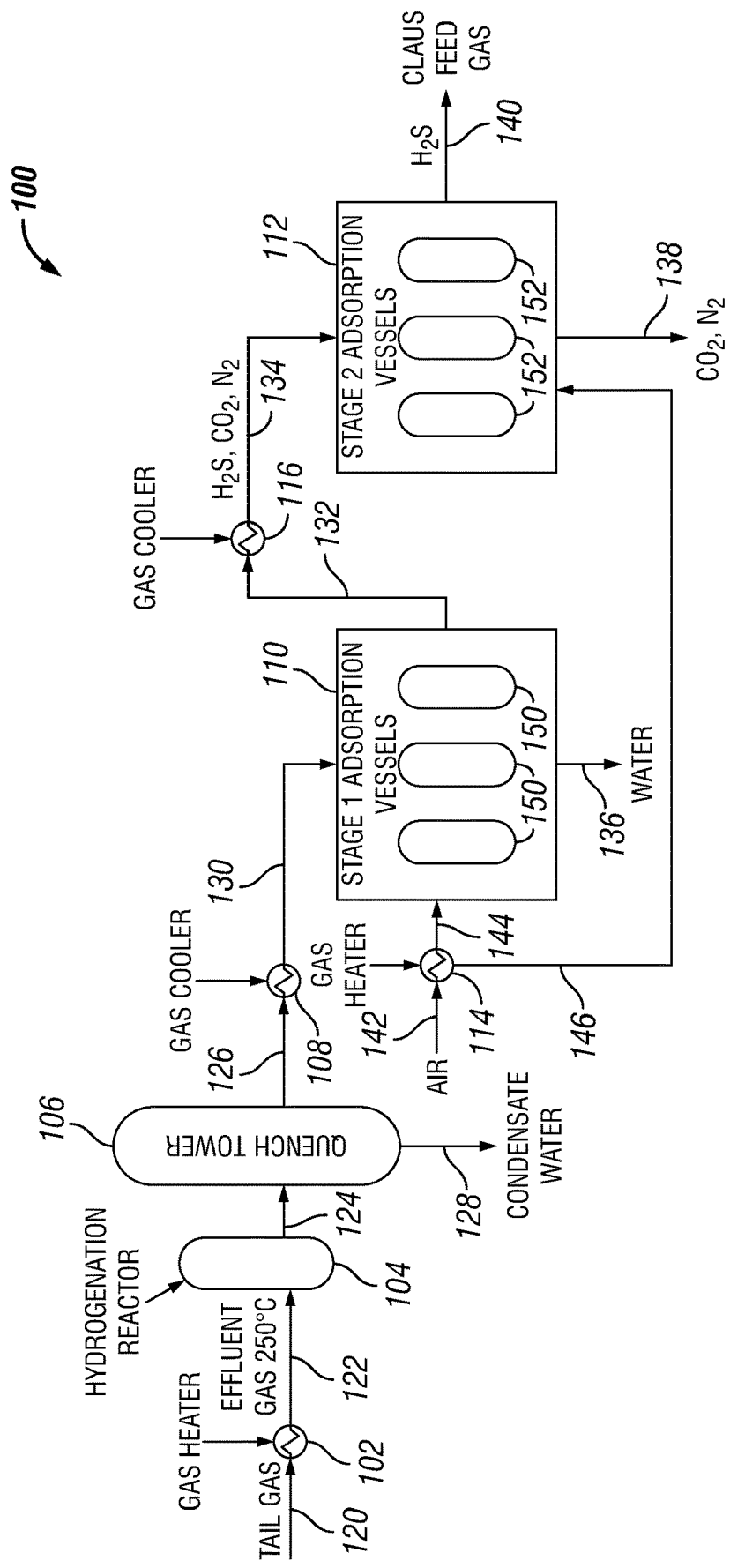
FIG. 1 is a schematic diagram of a process for Claus tail gas treatment according to an embodiment of the disclosure.

In the accompanying Figures, similar components or features, or both, may have a similar reference label.

DETAILED DESCRIPTION

The disclosure refers to particular features, including process or method steps and systems. Those of skill in the art understand that the disclosure is not limited to or by the description of embodiments given in the specification. The subject matter of this disclosure is not restricted except only in the spirit of the specification and appended claims.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

Although the disclosure has been described with respect to certain features, it should be understood that the features and embodiments of the features can be combined with other features and embodiments of those features.

Although the disclosure has been described in detail, it should be understood that various changes, substitutions, and alternations can be made without departing from the principle and scope of the disclosure. Accordingly, the scope of the present disclosure should be determined by the following claims and their appropriate legal equivalents.

As used throughout the disclosure, the singular forms "a," "an," and "the" include plural references unless the context clearly indicates otherwise.

As used throughout the disclosure, the word "about" includes +/−5% of the cited magnitude. The word "substantial" means greater than 50%.

As used throughout the disclosure, the words "comprise," "has," "includes," and all other grammatical variations are each intended to have an open, non-limiting meaning that does not exclude additional elements, components or steps. Embodiments of the present disclosure may suitably "comprise," "consist," or "consist essentially of" the limiting features disclosed, and may be practiced in the absence of a limiting feature not disclosed. For example, it can be recognized by those skilled in the art that certain steps can be combined into a single step.

As used throughout the disclosure, the words "optional" or "optionally" means that the subsequently described event or circumstances can or may not occur. The description includes instances where the event or circumstance occurs and instances where it does not occur.

Where a range of values is provided in the specification or in the appended claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended claims to a method comprising two or more defined steps, the defined steps can be carried out in any order or simultaneously except where the context excludes that possibility.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

As used throughout the disclosure, spatial terms described the relative position of an object or a group of objects relative to another object or group of objects. The spatial relationships apply along vertical and horizontal axes. Orientation and relational words are for descriptive convenience and are not limiting unless otherwise indicated.

As used throughout the disclosure, the term "elemental sulfur" refers to all phases of sulfur, which can exist in the forms such as S, $S_2$, $S_3$, $S_4$, $S_5$, $S_6$, $S_7$, and $S_8$.

Embodiments of the disclosure provide a Claus tail gas treatment system that can increase overall sulfur recovery (in combination with the Claus unit) to at least about 99.90%, alternately to at least about 99.93%, and alternately to at least about 99.95%. In some embodiments, the Claus tail gas treatment system is an add-on unit positioned at the end of the Claus unit configured to receive the tail gas from the Claus unit. In other embodiments, the Claus tail gas treatment system is an independent unit configured to receive the tail gas from the Claus unit. Still in other embodiments, the Claus tail gas treatment system can be positioned between two Claus converters within the Claus unit.

FIG. 1 shows a schematic diagram of a process 100 for an embodiment of the Claus tail gas treatment system. The process 100 includes a first heater 102, a hydrogenation reactor 104, a quench tower 106, a first cooler 108, a first stage adsorption unit 110, a second stage adsorption unit 112, a second heater 114, and a second cooler 116.

A tail gas stream 120 is heated via the first heater 102 to produce a hot gas stream 122. The hot gas stream 122 is introduced into the hydrogenation reactor 104 to produce a hydrogenated gas stream 124. The hydrogenated gas stream 124 is introduced into the quench tower 106 to produce a quenched gas stream 126 and a water condensate stream 128. The quenched gas stream 126 is cooled via the first cooler 108 to produce a first cool gas stream 130. The first cool gas stream 130 is introduced into the first stage adsorption unit 110 to produce a first outlet gas stream 132 and a first byproduct stream 136. The first outlet gas stream 132 is cooled via the second cooler 116 to produce a second cool gas stream 134. The second cool gas stream 134 is introduced into the second stage adsorption unit 112 to produce a second outlet gas stream 140 and a second byproduct stream 138.

Optionally, an air feed 142 can be heated via the second heater 114 to produce a first regeneration gas stream 144 and a second regeneration gas stream 146. The first regeneration gas stream 144 is introduced into the first stage adsorption unit 110. The second regeneration gas stream 146 is introduced into the second stage adsorption unit 112.

The tail gas stream 120 includes a Claus tail gas. The Claus tail gas includes sulfur-containing compounds that were not fully recovered by the Claus unit. The sulfur-containing compounds can exist in forms such as elemental sulfur, hydrogen sulfide, sulfur oxides, and anionic counterparts of the same. Non-limiting example sulfur oxides include SO, $SO_2$, $SO_3$, $SO_4$, $S_2O$, $S_2O_2$, $S_6O$, $S_6O_2$, $S_7O$, $S_7O_2$, $S_8O$, $S_9O$, and $S_{10}O$. The Claus tail gas can also include carbon dioxide, water, nitrogen, hydrogen, and combinations of the same.

The first heater 102 can be any heat exchanger capable of heating a gas stream to a temperature at which hydrogenation reactions can occur in the hydrogenation reactor 104. The first heater 102 can heat the tail gas stream 120 such that the hot gas stream 122 has a temperature between about 200° C. and about 300° C., alternately between about 220° C. and about 280° C., and alternately between about 240° C. and about 260° C. In at least one embodiment, the temperature of the hot gas stream 122 is about 250° C. The hot gas stream 122 can include the sulfur-containing compounds, carbon dioxide, water, nitrogen, hydrogen, and combinations of the same.

The hydrogenation reactor 102 can be any reactor, catalytic or non-catalytic, capable of reducing the sulfur-containing compounds other than hydrogen sulfide to hydrogen sulfide. Optionally, hydrogen included in the hot gas stream 122 can be used for reducing the sulfur-containing compounds to hydrogen sulfide. Optionally, a make-up hydrogen gas stream (not shown) can be introduced into the hydrogenation reactor 102. Optionally, water can be produced as a byproduct during the hydrogenation reaction. As a result, the hydrogenated gas stream 124 includes sulfur-containing compounds of substantially hydrogen sulfide only. The hydrogenated gas stream 124 can also include carbon dioxide, water, nitrogen, and combinations of the same.

The quench tower 106 can be any apparatus capable of condensing and recovering water. A substantial portion of water included in the hydrogenated gas stream 124 is condensed and substantially recovered via the water condensate stream 128. Although a substantial portion of water included in the hydrogenated gas stream 124 is removed, the resulting quenched gas stream 126 can still include residual amounts of gas phase water. The quenched gas stream 126 has a gas phase water content ranging between about 0 mol % and about 20 mol %, alternately between about 3 mol % and about 15 mol %, or alternately between about 4 mol % and about 10 mol %. In at least one embodiment, the gas phase water content of the quenched gas stream 126 is about 8 mol %. The quenched gas stream 126 can also include hydrogen sulfide (that is, the hydrogen sulfide preexisting in the Claus tail gas or produced in the hydrogenation reactor 102, or both), carbon dioxide, nitrogen, and combinations of the same. The quenched gas stream 126 has a temperature ranging between about 20° C. and about 170° C., alternately between about 30° C. and about 100° C., or alternately between about 40° C. and about 80° C. In at least one embodiment, the temperature of the quenched gas stream 126 is about 43° C.

The first cooler 108 can be any heat exchanger capable of cooling a gas stream to a temperature at which adsorption occurs in the first stage adsorption unit 110. The first cooler 108 can cool the quenched gas stream 126 such that the first cool gas stream 130 has a temperature ranging between about 0° C. and about 70° C., alternately between about 10° C. and about 40° C., and alternately between about 15° C. and about 30° C. In at least one embodiment, the temperature of the first cool gas stream 130 is about 21° C. As the quenched gas stream 126 is cooled, the gas phase water content of the first cool gas stream 130 reduces to a range between about 0 mol % and about 10 mol %, alternately between about 0 mol % and about 5 mol %, or alternately between about 0 mol % and about 1 mol %. In at least one embodiment, the gas phase water content of first cool gas stream 130 is about 0.46 mol %. The first cool gas stream 130 can include hydrogen sulfide (that is, the hydrogen sulfide preexisting in the Claus tail gas or produced in the hydrogenation reactor 102, or both), carbon dioxide, water, nitrogen, and combinations of the same.

The first stage adsorption unit 110 includes one or more first adsorption vessels 150 fluidly connected in a serial or parallel manner. Each of the one or more first vessels 150 is filled with a first adsorbent. The first adsorbent can include any adsorbent capable of selectively capturing hydrogen sulfide, carbon dioxide, and nitrogen while rejecting water from a wet gas stream (such as the first cool gas stream 130). Non-limiting example materials used for the first adsorbent include all-silica zeolites having a framework such as an MFI type or a CHA type. The all-silica zeolites are hydrophobic materials that can be used to separate polar molecules such as water from lesser polar molecules such as hydrogen sulfide, carbon dioxide, and nitrogen. During an adsorption cycle, components of the first cool gas stream 130 are introduced through the one or more first adsorption vessels 150 of the first stage adsorption unit 110. Components other than water (that is, hydrogen sulfide, carbon dioxide, and nitrogen) are captured in the pores of the first adsorbent. Water passes through the first adsorbent and is subsequently collected via the first byproduct stream 136. During a regeneration cycle, components of the first regeneration gas stream 144 enter the one or more first adsorption vessels 150 to regenerate the first adsorbent. Desorption occurs in the one or more first adsorption vessels 150, where the first adsorbent releases the captured hydrogen sulfide, carbon dioxide, and nitrogen to produce the first outlet gas stream 132 in the absence of water.

In an alternate embodiment, the first adsorbent can include any adsorbent capable of selectively capturing water form a wet gas stream (such as the first cool gas stream 130) while rejecting hydrogen sulfide, carbon dioxide, and nitrogen. Non-limiting example materials used for the first adsorbent include hydrophilic 3Å molecular sieves as shown for example in U.S. Pat. Pub. No. 2017/0190574, which is incorporated in this disclosure by reference in its entirety. During an adsorption cycle, components of the first cool gas stream 130 are introduced through the one or more first adsorption vessels 150 of the first stage adsorption unit 110. Water is captured in the pores of the first adsorbent. Components other than water (that is, hydrogen sulfide, carbon dioxide, and nitrogen) pass through the first adsorbent to produce the first outlet gas stream 132 in the absence of water. During a regeneration cycle, components of the first regeneration gas stream 144 enter the one or more first adsorption vessels 150 to regenerate the first adsorbent. Desorption occurs in the one or more first adsorption vessels 150, where the first adsorbent releases the captured water which can be collected via the first byproduct stream 136.

In some embodiments, the first stage adsorption unit 110 includes at least three first adsorption vessels 150 fluidly connected in a parallel manner. At any given moment during operation, one of the at least three first adsorption vessels 150 is conducting the adsorption cycle, one of the at least three first adsorption vessels 150 is conducting the regeneration cycle, and one of the at least three first adsorption vessels 150 is standing by. In this manner, components of the first cool gas stream 130 can be continuously fed into the first stage adsorption unit 110 and a continuous flow of the first outlet gas stream 132 can be produced from the first stage adsorption unit 110.

The second cooler 116 can be any heat exchanger capable of cooling a gas stream to a temperature at which adsorption occurs in the second stage adsorption unit 112. The second cooler 116 can cool the first outlet gas stream 132 such that the second cool gas stream 134 has a temperature between about 0° C. and about 70° C., alternately between about 10° C. and about 40° C., and alternately between about 15° C. and about 30° C. In at least one embodiment, the temperature of the second cool gas stream 134 is about 25° C. The second cool gas stream 134 can include hydrogen sulfide, carbon dioxide, nitrogen, and combinations of the same, all of which are products of the first stage adsorption unit 110.

The second stage adsorption unit 112 includes one or more second adsorption vessels 152 fluidly connected in a serial or parallel manner. Each of the one or more second adsorption vessels 152 is filled with a second adsorbent. In some embodiments, the second adsorbent can include any adsorbent capable of selectively capturing hydrogen sulfide while rejecting carbon dioxide and nitrogen. In other embodiments, the second adsorbent can include any adsorbent having differences in breakthrough time between hydrogen sulfide and carbon dioxide, and between hydrogen sulfide and nitrogen. Non-limiting example materials used for the second adsorbent include hydrophobic zeolites having a framework such as an MFI type, a CHA type, an FAU type, an MOR type, a DDR type, an FER type, and an MWW type. Non-limiting example materials used for the second adsorbent also include hydrophobic zeolites such as MOFs and ZIFs. During an adsorption cycle, components of the second cool gas stream 134 are introduced through the one or more second adsorption vessels 152 of the second stage adsorption unit 112. Hydrogen sulfide is captured in the pores of the second adsorbent. Components other than hydrogen sulfide (that is, carbon dioxide and nitrogen) pass through the second adsorbent and are subsequently collected via the second byproduct stream 138. During a regeneration cycle, components of the second regeneration gas stream 146 enter the one or more second adsorption vessels 152 to regenerate the second adsorbent. Desorption occurs in the one or more second adsorption vessels 152, where the second adsorbent releases the captured hydrogen sulfide to produce the second outlet gas stream 140 in the absence of carbon dioxide and nitrogen.

In some embodiments, the second stage adsorption unit 112 includes at least three second adsorption vessels 152 fluidly connected in a parallel manner. At any given moment during operation, one of the at least three second adsorption vessels 152 is conducting the adsorption cycle, one of the at least three second adsorption vessels 152 is conducting the regeneration cycle, and one of the at least three second adsorption vessels 152 is standing by. In this manner, components of the second cool gas stream 134 can be continuously fed into the second stage adsorption unit 112 and a continuous flow of the second outlet gas stream 140 can be produced from the second stage adsorption unit 112.

The air feed 142 can be any oxygen-containing gas suitable for regenerating adsorbent materials. Non-limiting example gases suitable for use as the air feed 142 include air, oxygen-enriched air, pure oxygen, and combinations of the same. In at least one embodiment, the air feed 142 is air.

The second heater 114 can be any heat exchanger capable of heating a gas stream to a temperature at which adsorbent regeneration occurs in each of the first stage adsorption unit 110 and the second stage adsorption unit 112. The second heater 114 can heat the air feed 142 such that each of the first regeneration gas stream 144 and the second regeneration gas stream 146 has a temperature between about 150° C. and about 350° C., alternately between about 200° C. and about 300° C., and alternately between about 230° C. and about 290° C. In at least one embodiment, the temperature of each of the first regeneration gas stream 144 and the second regeneration gas stream 146 is about 260° C.

The second outlet gas stream 140 includes hydrogen sulfide. The second outlet gas stream 140 has a hydrogen sulfide content of at least about 95 wt. %, alternately at least about 98 wt. %, and alternately at least about 99 wt. %. In some embodiments, the second outlet gas stream 140 can be used as a feed gas for the Claus unit.

Figure 2:
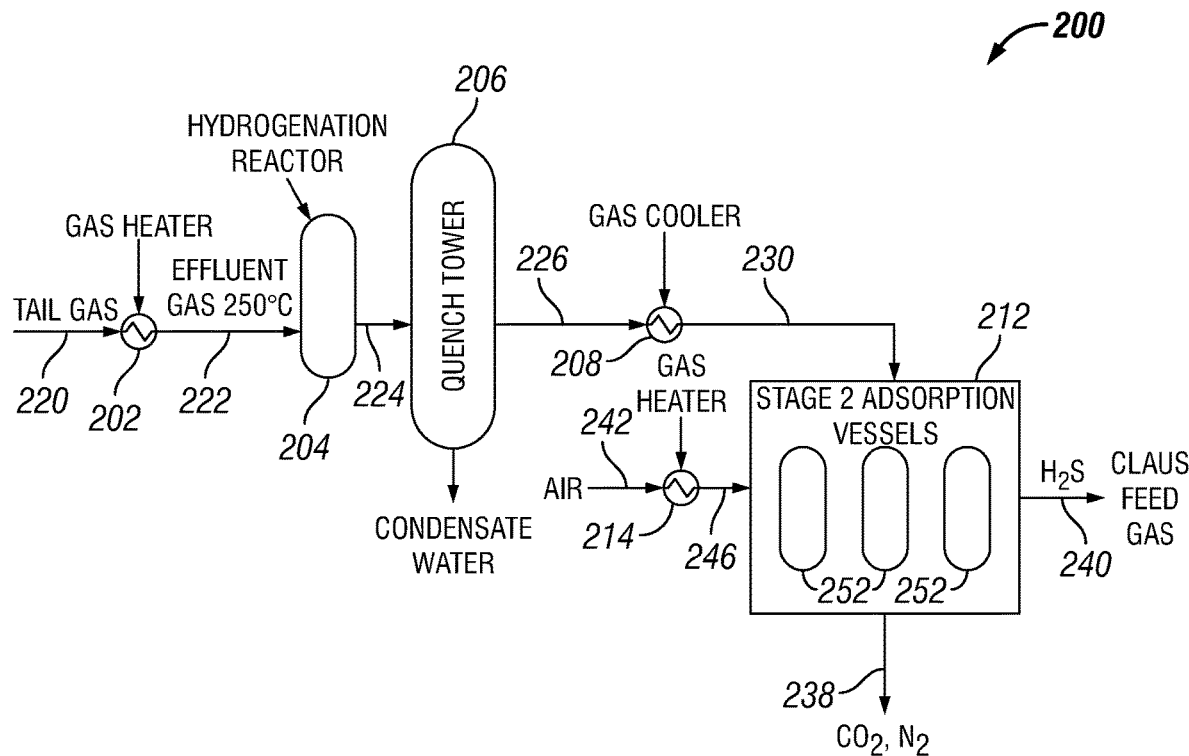
FIG. 2 is a schematic diagram of a process for Claus tail gas treatment according to an embodiment of the disclosure.

FIG. 2 shows a schematic diagram of a process 200 for an embodiment of the Claus tail gas treatment system. The process 200 includes a first heater 202, a hydrogenation reactor 204, a quench tower 206, a cooler 208, an adsorption unit 212, and a second heater 214.

A tail gas stream 220 is heated via the first heater 202 to produce a hot gas stream 222. The hot gas stream 222 is introduced into the hydrogenation reactor 204 to produce a hydrogenated gas stream 224. The hydrogenated gas stream 224 is introduced into the quench tower 206 to produce a quenched gas stream 226 and a water condensate stream 228. The quenched gas stream 226 is cooled via the cooler 208 to produce a cool gas stream 230. The cool gas stream 230 is introduced into the adsorption unit 212 to produce an outlet gas stream 240 and a byproduct stream 238.

Optionally, an air feed 242 can be heated via the second heater 214 to produce a regeneration gas stream 246. The regeneration gas stream 146 is introduced into the adsorption unit 212.

The tail gas stream 220 includes a Claus tail gas. The Claus tail gas includes sulfur-containing compounds that were not fully recovered by the Claus unit. The sulfur-containing compounds can exist in forms such as elemental sulfur, hydrogen sulfide, sulfur oxides, and anionic counterparts of the same. Non-limiting example sulfur oxides include $SO$, $SO_2$, $SO_3$, $SO_4$, $S_2O$, $S_2O_2$, $S_6O$, $S_6O_2$, $S_7O$, $S_7O_2$, $S_8O$, $S_9O$, and $S_{10}O$. The Claus tail gas can also include carbon dioxide, water, nitrogen, hydrogen, and combinations of the same.

The first heater 202 can be any heat exchanger capable of heating a gas stream to a temperature at which hydrogenation reactions can occur in the hydrogenation reactor 204. The first heater 202 can heat the tail gas stream 220 such that the hot gas stream 222 has a temperature between about 200° C. and about 300° C., alternately between about 220° C. and about 280° C., and alternately between about 240° C. and about 260° C. In at least one embodiment, the temperature of the hot gas stream 222 is about 250° C. The hot gas stream 222 can include the sulfur-containing compounds, carbon dioxide, water, nitrogen, hydrogen, and combinations of the same.

The hydrogenation reactor 202 can be any reactor, catalytic or non-catalytic, capable of reducing the sulfur-containing compounds other than hydrogen sulfide to hydrogen sulfide. Optionally, hydrogen included in the hot gas stream 222 can be used for reducing the sulfur-containing compounds to hydrogen sulfide. Optionally, a hydrogen gas stream (not shown) can be introduced into the hydrogenation reactor 202. Optionally, water can be produced as a byproduct during the hydrogenation reaction. As a result, the hydrogenated gas stream 224 includes sulfur-containing compounds of hydrogen sulfide only. The hydrogenated gas stream 224 can also include carbon dioxide, water, nitrogen, and combinations of the same.

The quench tower 206 can be any apparatus capable of condensing and recovering water. The water included in the hydrogenated gas stream 224 is condensed and substantially recovered via the water condensate stream 228. The resulting quenched gas stream 226 has a water content of less than about 1 mol %, alternately less than about 0.5 mol %, and alternately less than about 0.1 mol %. In at least one embodiment, the quenched gas stream 226 is in the absence of water. The quenched gas stream 226 can also include hydrogen sulfide (that is, the hydrogen sulfide preexisting in the Claus tail gas or produced in the hydrogenation reactor 202, or both), carbon dioxide, nitrogen, and combinations of the same. The quenched gas stream 226 has a temperature ranging between about 20° C. and about 170° C., alternately between about 30° C. and about 100° C., or alternately between about 40° C. and about 80° C. In at least one embodiment, the temperature of the quenched gas stream 226 is about 43° C.

The cooler 208 can be any heat exchanger capable of cooling a gas stream to a temperature at which adsorption occurs in the adsorption unit 212. The cooler 208 can cool the quenched gas stream 226 such that the cool gas stream 230 has a temperature between about 0° C. and about 70° C., alternately between about 10° C. and about 40° C., and alternately between about 15° C. and about 30° C. In at least one embodiment, the temperature of the cool gas stream 230 is about 21° C. The cool gas stream 230 can include hydrogen sulfide (that is, the hydrogen sulfide preexisting in the Claus tail gas or produced in the hydrogenation reactor 202, or both), carbon dioxide, nitrogen, and combinations of the same.

The adsorption unit 212 includes one or more adsorption vessels 252 fluidly connected in a serial or parallel manner. Each of the one or more adsorption vessels 252 is filled with an adsorbent. In some embodiments, the adsorbent can include any adsorbent capable of selectively capturing hydrogen sulfide while rejecting carbon dioxide and nitrogen. In other embodiments, the adsorbent can include any adsorbent having differences in breakthrough time between hydrogen sulfide and carbon dioxide, and between hydrogen sulfide and nitrogen. Non-limiting example materials used for the adsorbent include hydrophobic zeolites having a framework such as an MFI type, a CHA type, an FAU type, an MOR type, a DDR type, an FER type, and an MWW type. Non-limiting example materials used for the adsorbent also include hydrophobic zeolites such as MOFs and ZIFs. During an adsorption cycle, components of the cool gas stream 230 are introduced through the one or more adsorption vessels 252 of the adsorption unit 212. Hydrogen sulfide is captured in the pores of the adsorbent. Components other than hydrogen sulfide (that is, carbon dioxide and nitrogen) pass through the adsorbent and are subsequently collected via the byproduct stream 238. During a regeneration cycle, components of the regeneration gas stream 246 enter the one or more adsorption vessels 252 to regenerate the adsorbent. Desorption occurs in the one or more adsorption vessels 252, where the adsorbent releases the captured hydrogen sulfide to produce the outlet gas stream 240 in the absence of carbon dioxide and nitrogen.

In some embodiments, the adsorption unit 212 includes at least three adsorption vessels 252 fluidly connected in a parallel manner. At any given moment during operation, one of the at least three adsorption vessels 252 is conducting the adsorption cycle, one of the at least three adsorption vessels 252 is conducting the regeneration cycle, and one of the at least three adsorption vessels 252 is standing by. In this manner, components of the cool gas stream 230 can be continuously fed into the adsorption unit 212 and a continuous flow of the outlet gas stream 240 can be produced from the adsorption unit 212.

The air feed 242 can be any oxygen-containing gas suitable for regenerating adsorbent materials. Non-limiting example gases suitable for use as the air feed 242 include air, oxygen-enriched air, pure oxygen, and combinations of the same. In at least one embodiment, the air feed 242 is air.

The second heater 214 can be any heat exchanger capable of heating a gas stream to a temperature at which adsorbent regeneration occurs in the adsorption unit 212. The second heater 214 can heat the air feed 242 such that the regeneration gas stream 246 has a temperature between about 150°

C. and about 350° C., alternately between about 200° C. and about 300° C., and alternately between about 230° C. and about 290° C. In at least one embodiment, the temperature of the regeneration gas stream 246 is about 260° C.

The outlet gas stream 240 includes hydrogen sulfide. The outlet gas stream 240 has a hydrogen sulfide content of at least about 95 wt. %, alternately at least about 98 wt. %, and alternately at least about 99 wt. %. In some embodiments, the outlet gas stream 240 can be used as a feed gas for the Claus unit.

EXAMPLES

The disclosure is illustrated by the following examples, which are presented for illustrative purposes only, and are not intended as limiting the scope of the invention which is define by the appended claims.

Example 1

A grand canonical Monte Carlo (GCMC) simulation was conducted to determine the adsorption of hydrogen sulfide and water and the selectivity of hydrogen sulfide over water using an all-silica MFI type zeolite as the first adsorbent for the first stage adsorption unit 110. Six million Monte Carlo iterations were performed to reach equilibrium and statistical averages were subsequently determined. Temperature was set at 393 K (120° C.). Hydrogen sulfide and water were defined to have a molecular ratio of 1:3. The adsorption capacity of the all-silica MFI type zeolite with respect to hydrogen sulfide and water was calculated. The results are plotted in FIG. 3. The selectivity of hydrogen sulfide over water is plotted in FIG. 4.

Figure 3:
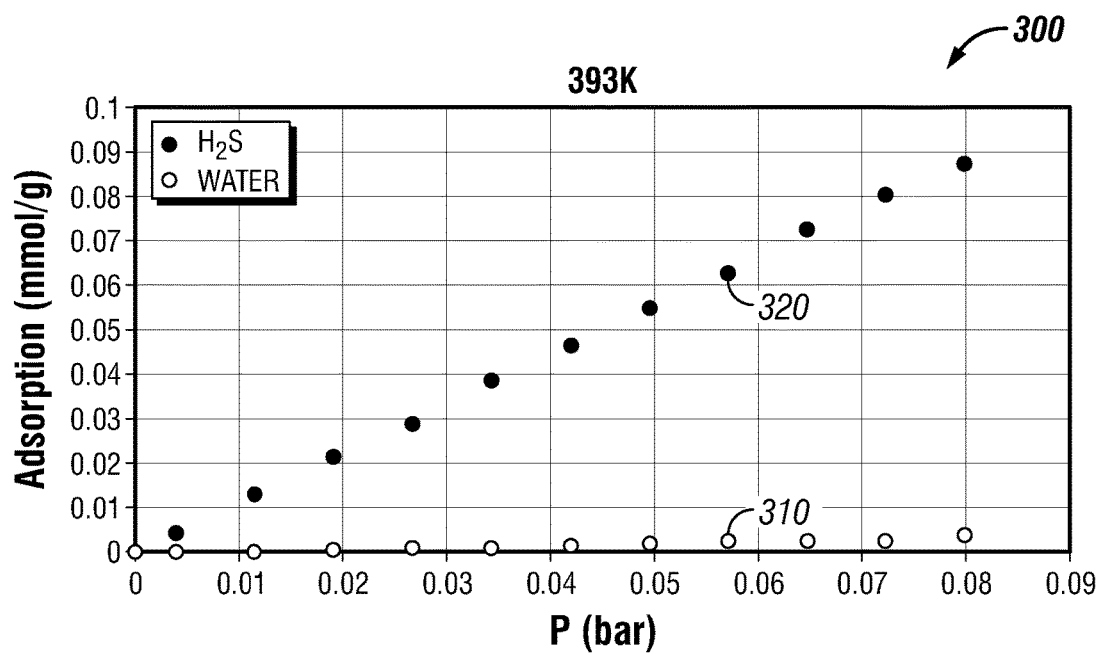
FIG. 3 is a graphical representation showing adsorption isotherms of hydrogen sulfide and water using an adsorbent according to an embodiment of the disclosure.

FIG. 3 is a graphical representation 300 showing adsorption isotherms of hydrogen sulfide and water using the all-silica MFI type zeolite at 393 K (120° C.). The horizontal axis represents partial pressure of gaseous components expressed in bar. The vertical axis represents the adsorption capacity of the all-silica MFI type zeolite expressed in millimoles per gram (mmol/g). The following points are shown in FIG. 3: blank circular points 310 represent water; and filled circular points 320 represent hydrogen sulfide.

Figure 4:
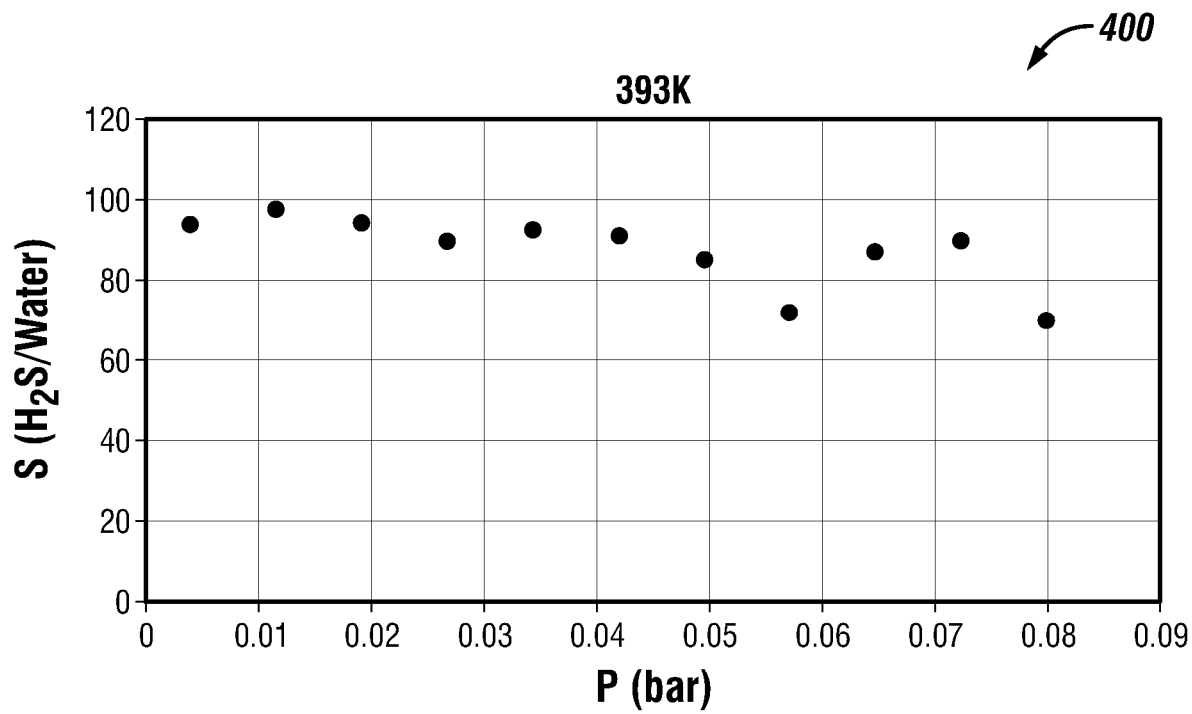
FIG. 4 is a graphical representation showing the selectivity of hydrogen sulfide over water according to an embodiment of the disclosure.

FIG. 4 is a graphical representation 400 showing the selectivity of hydrogen sulfide over water at 393 K (120° C.). The horizontal axis represents partial pressure of gaseous components expressed in bar. The vertical axis represents the selectivity (S) of hydrogen sulfide over water expressed in a percentage of the adsorption capacity of hydrogen sulfide over the adsorption capacity of water.

The results depicted in FIGS. 3 and 4 show that the all-silica MFI zeolite can selectively capture hydrogen sulfide while rejecting water and therefore is a suitable material used as the first adsorbent for the first stage adsorption unit 110.

Example 2

A GCMC simulation was conducted to determine the adsorption of 1 mol % hydrogen sulfide using a Cu—Y type zeolite (a derivative of an FAU type zeolite which includes copper cations as counterions) as the second adsorbent for the second stage adsorption unit 112 or the adsorbent for the adsorption unit 212. Six million Monte Carlo iterations were performed to reach equilibrium and statistical averages were subsequently determined. It was assumed that no chemical interactions took place. It was also assumed that gaseous components other than hydrogen sulfide were not competing for adsorption. Temperature was set at 298 K (25° C.). The adsorption capacity of the Cu—Y type zeolite with respect to hydrogen sulfide was calculated. The results are plotted in FIG. 5.

Figure 5:
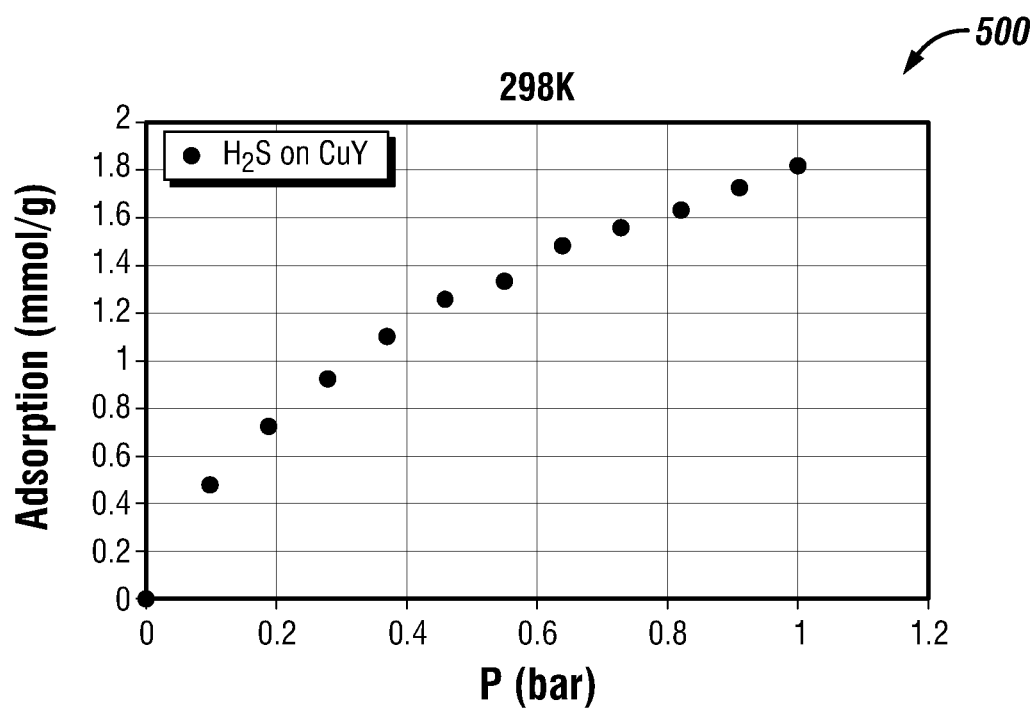
FIG. 5 is a graphical representation showing an adsorption isotherm of hydrogen sulfide using an adsorbent according to an embodiment of the disclosure.

FIG. 5 is a graphical representation 500 showing an adsorption isotherm of hydrogen sulfide using the Cu—Y type zeolite at 25° C. The horizontal axis partial pressure of gaseous components expressed in bar. The vertical axis represents the adsorption capacity of the Cu—Y type zeolite expressed in mmol/g.

The results depicted in FIG. 5 show that the Cu—Y type zeolite can capture hydrogen sulfide and therefore is a suitable material used as the second adsorbent for the second stage adsorption unit 112 or the adsorbent for the adsorption unit 212.

Example 3

Experiments were conducted to determine the separation of hydrogen sulfide and carbon dioxide using an H—Y type zeolite (a derivative of an FAU type zeolite which includes protons as counterions) as the second adsorbent for the second stage adsorption unit 112 or the adsorbent for the adsorption unit 212. The experimental setup included a dynamic adsorption unit. The dynamic adsorption unit included an adsorption bed of H—Y type zeolite with a heating element placed adjacent to the adsorption bed. A continuous gas flow was introduced to the dynamic adsorption unit. The gas flow included a gas mixture of 1 mol % hydrogen sulfide, 33 mol % carbon dioxide, and 66 mol % nitrogen. The temperature was set at 298 K (25° C.). The effluent gas was analyzed by gas chromatography (GC) to determine mole concentrations of hydrogen sulfide, carbon dioxide, and nitrogen over time. The results are plotted in FIGS. 6 and 7.

Figure 6:
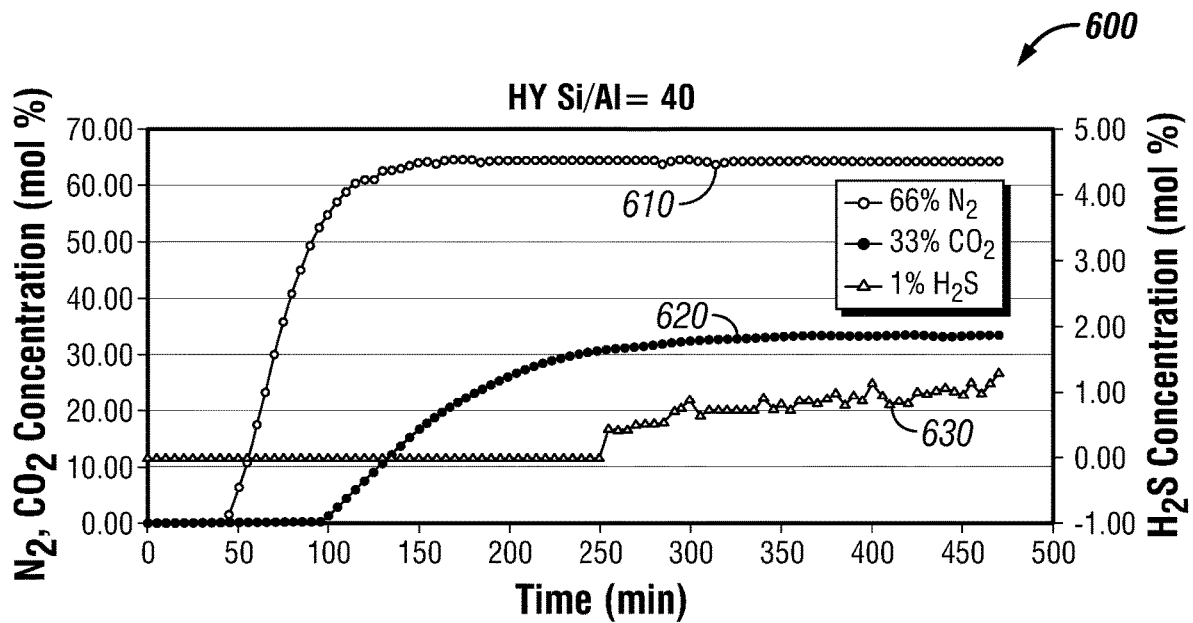
FIG. 6 is a graphical representation showing breakthrough curves of hydrogen sulfide, carbon dioxide, and nitrogen included in a gas mixture using an adsorbent according to an embodiment of the disclosure.

FIG. 6 is a graphical representation 600 showing breakthrough curves of hydrogen sulfide, carbon dioxide, and nitrogen included in the gas mixture using the H—Y type zeolite at 298 K (25° C.) and at a total pressure of 1 bar. The horizontal axis represents time in minutes (min). The left-hand side vertical axis represents the concentration of carbon dioxide and nitrogen in mol %. The right-hand side vertical axis represents the concentration of hydrogen sulfide in mol %. The following points are shown in FIG. 6: blank circular points 610 represent nitrogen; filled circular points 620 represent carbon dioxide; and triangular points 630 represent hydrogen sulfide.

As shown in FIG. 6, the breakthrough times (corresponding to the threshold times of the breakthrough curves) of carbon dioxide (about 100 min) and nitrogen (about 50 min) are significantly lesser than that of hydrogen sulfide (about 250 min). As used throughout the disclosure, the term "breakthrough time" of a certain gaseous component refers to the amount of time elapsed until the gaseous component is detected by GC. In the beginning of the experiment, the gaseous component is not detectable by GC because it is adsorbed by the adsorbent. Once the adsorption capacity of the adsorbent reaches its maximum, the adsorbent becomes saturated. Accordingly, beyond the breakthrough time, the gaseous component does not undergo further adsorption and becomes detectable by GC.

Figure 7:
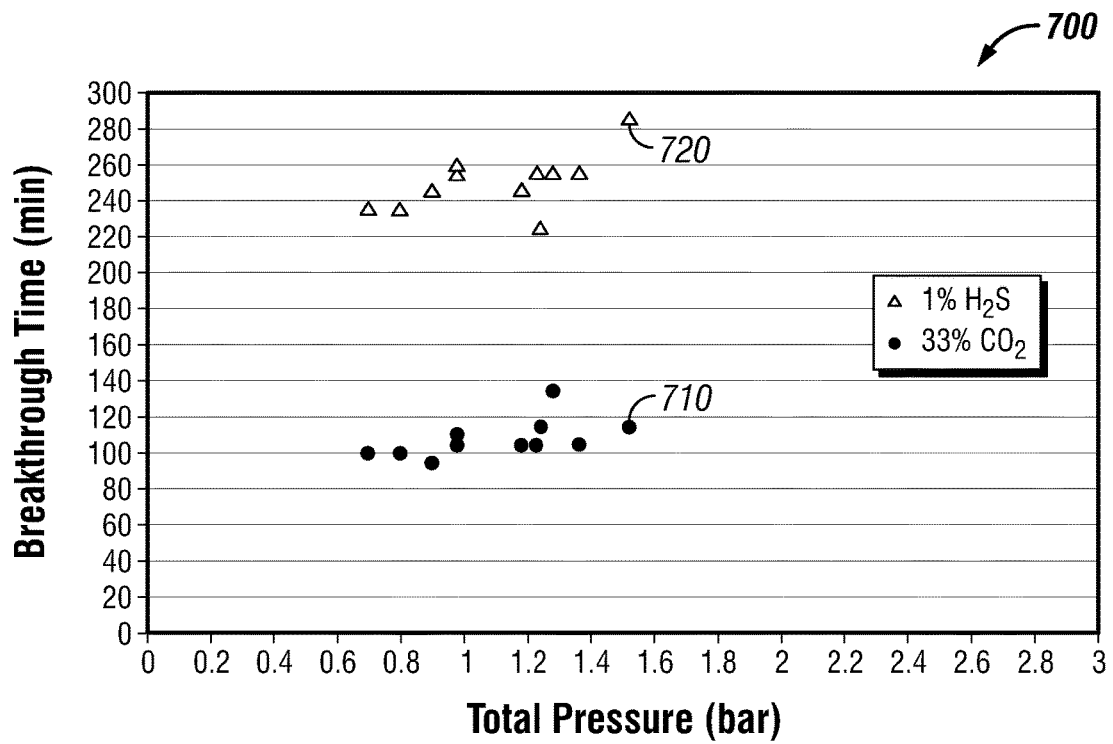
FIG. 7 is a graphical representation showing breakthrough times of hydrogen sulfide and carbon dioxide included in the gas mixture using an adsorbent according to an embodiment of the disclosure.

FIG. 7 is a graphical representation 700 showing breakthrough times of hydrogen sulfide and carbon dioxide included in the gas mixture using the H—Y type zeolite at 298 K (25° C.) and at various total pressures on 11 runs. The horizontal axis represents time in min. The left-hand side vertical axis represents the concentration of carbon dioxide and nitrogen in mol %. The right-hand side vertical axis represents the concentration of hydrogen sulfide in mol %. The following points are shown in FIG. 7: filled circular points 710 represent carbon dioxide; and triangular points 720 represent hydrogen sulfide. The breakthrough times of nitrogen were omitted due to having the shortest breakthrough times among the three gaseous components. As shown in FIG. 7, the breakthrough times of hydrogen sulfide ranges between 220 min and 290 min while the breakthrough times of carbon dioxide ranges between 90 min and 140 min.

The results depicted in FIGS. 6 and 7 show that due to the differences in breakthrough times between hydrogen sulfide and carbon dioxide and between hydrogen sulfide and nitrogen, the H—Y type zeolite can be used to capture hydrogen sulfide while rejecting carbon dioxide and nitrogen and therefore is a suitable material used as the second adsorbent for the second stage adsorption unit 112 or the adsorbent for the adsorption unit 212.

Example 4

Experiments were conducted to determine the desorption capacity of the H—Y type zeolite as the second adsorbent for the second stage adsorption unit 112 or the adsorbent for the adsorption unit 212 during the regeneration cycle. The experimental setup included a dynamic adsorption unit. The dynamic adsorption unit included an adsorption bed of H—Y type zeolite with a heating element placed adjacent to the adsorption bed. A gas flow was introduced to the dynamic adsorption unit until the H—Y type zeolite was saturated. The gas flow included a gas mixture of 1 mol % hydrogen sulfide, 33 mol % carbon dioxide, and 66 mol % nitrogen. Once the H—Y type zeolite was saturated, a continuous flow of argon gas was introduced to the dynamic adsorption unit to regenerate the H—Y type zeolite in the presence of heat. The experiments were conducted at 298 K (25° C.), at 323 K (50° C.), and at 348 K (75° C.). The total pressure was set at 1 bar. The effluent gas was analyzed by GC to determine mole concentrations of hydrogen sulfide, carbon dioxide, and nitrogen over time and to determine the time and temperature required to fully regenerate the H—Y type zeolite for each of hydrogen sulfide, carbon dioxide, and nitrogen. The results are plotted in FIGS. 8-10.

Figure 8:
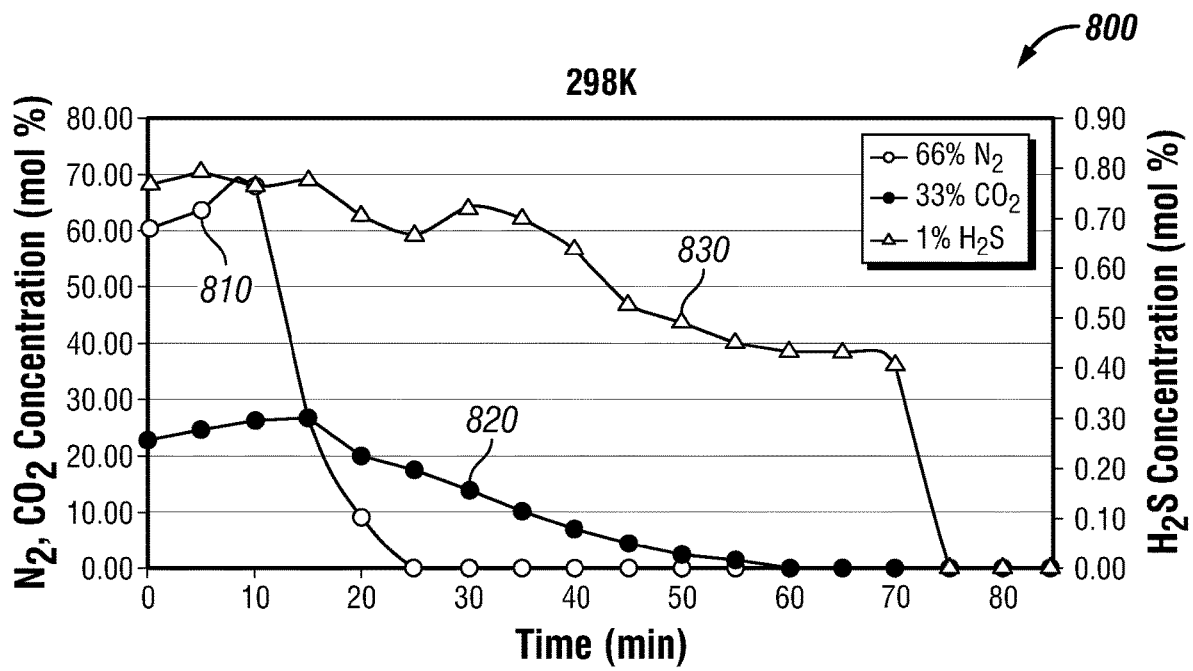
FIG. 8 is a graphical representation showing desorption curves of hydrogen sulfide, carbon dioxide, and nitrogen included in the gas mixture using an adsorbent according to an embodiment of the disclosure.

FIG. 8 is a graphical representation 800 showing desorption curves of hydrogen sulfide, carbon dioxide, and nitrogen included in the gas mixture using the H—Y type zeolite at 298 K (25° C.). The horizontal axis represents time in min. The left-hand side vertical axis represents the concentration of carbon dioxide and nitrogen in mol %. The right-hand side vertical axis represents the concentration of hydrogen sulfide in mol %. The following points are shown in FIG. 8: blank circular points 810 represent nitrogen; filled circular points 820 represent carbon dioxide; and triangular points 830 represent hydrogen sulfide. As shown in FIG. 8, the H—Y type zeolite can be fully regenerated in about 75 min, which is when hydrogen sulfide is no longer detected by GC.

Figure 9:
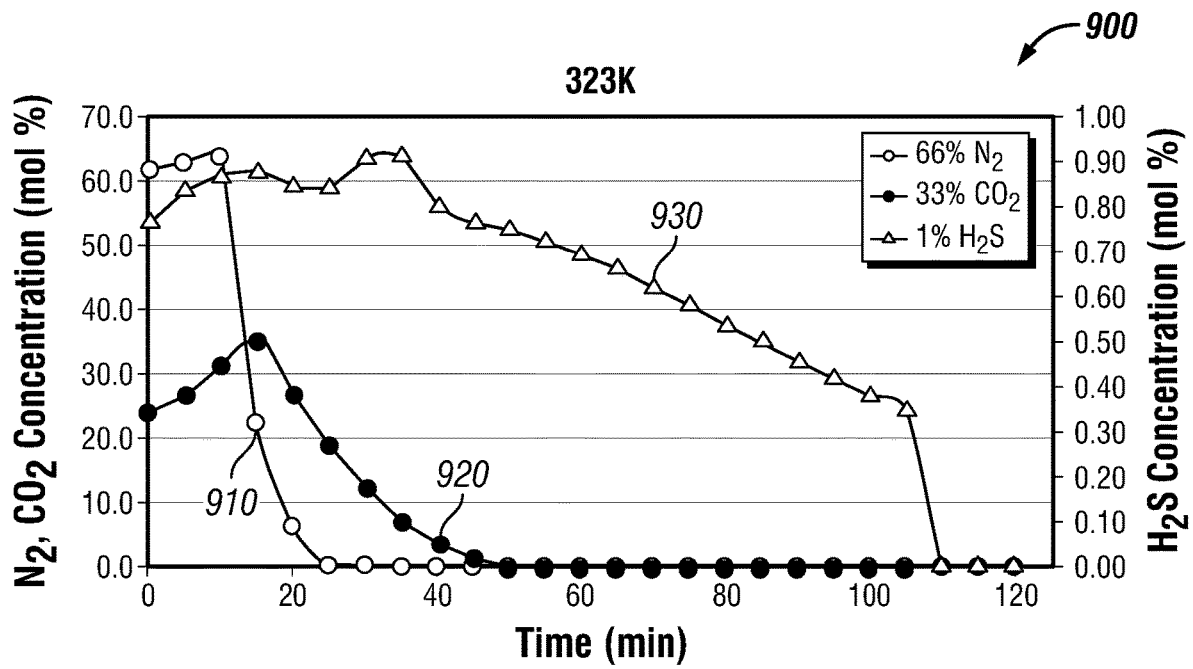
FIG. 9 is a graphical representation showing desorption curves of hydrogen sulfide, carbon dioxide, and nitrogen included in the gas mixture using an adsorbent according to an embodiment of the disclosure.

FIG. 9 is a graphical representation 900 showing desorption curves of hydrogen sulfide, carbon dioxide, and nitrogen included in the gas mixture using the H—Y type zeolite at 323 K (50° C.). The horizontal axis represents time in min. The left-hand side vertical axis represents the concentration of carbon dioxide and nitrogen in mol %. The right-hand side vertical axis represents the concentration of hydrogen sulfide in mol %. The following points are shown in FIG. 9: blank circular points 910 represent nitrogen; filled circular points 920 represent carbon dioxide; and triangular points 930 represent hydrogen sulfide. As shown in FIG. 9, the H—Y type zeolite can be fully regenerated in about 110 min, which is when hydrogen sulfide is no longer detected by GC.

Figure 10:
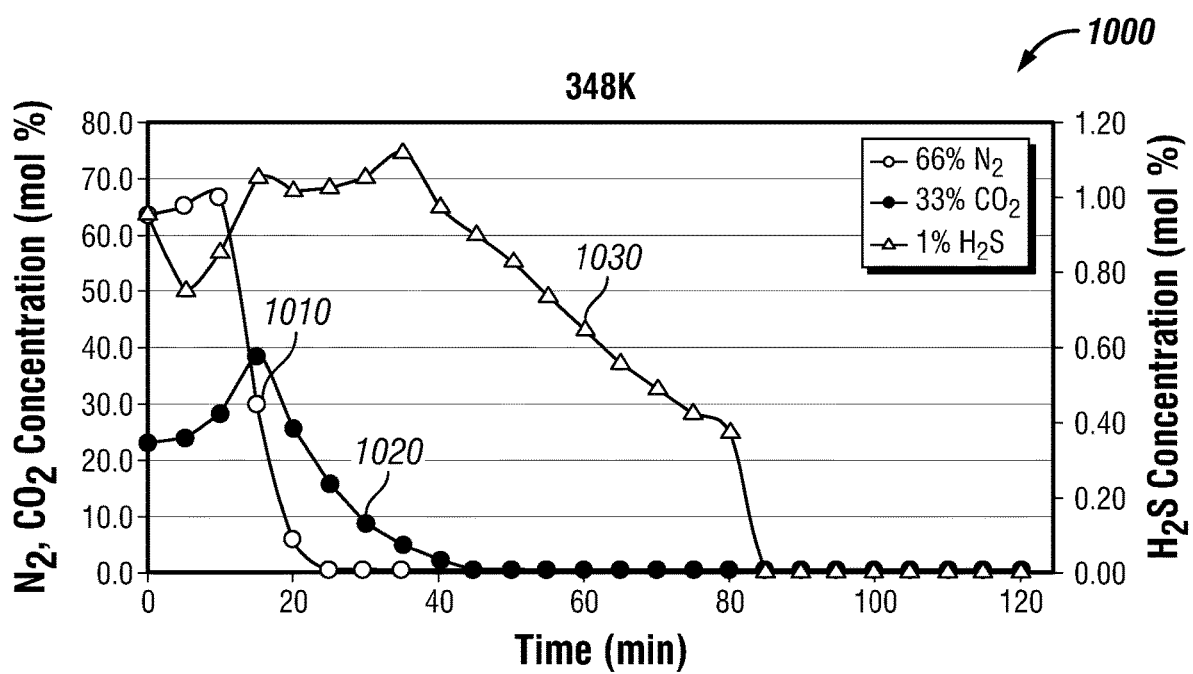
FIG. 10 is a graphical representation showing desorption curves of hydrogen sulfide, carbon dioxide, and nitrogen included in the gas mixture using an adsorbent according to an embodiment of the disclosure.

FIG. 10 is a graphical representation 1000 showing desorption curves of hydrogen sulfide, carbon dioxide, and nitrogen included in the gas mixture using the H—Y type zeolite at 348 K (75° C.). The horizontal axis represents time in min. The left-hand side vertical axis represents the concentration of carbon dioxide and nitrogen in mol %. The right-hand side vertical axis represents the concentration of hydrogen sulfide in mol %. The following points are shown in FIG. 10: blank circular points 1010 represent nitrogen; filled circular points 1020 represent carbon dioxide; and triangular points 1030 represent hydrogen sulfide. As shown in FIG. 10, the H—Y type zeolite can be fully regenerated in about 85 min, which is when hydrogen sulfide is no longer detected by GC.

The results depicted in FIGS. 8-10 show that full regeneration of the second adsorbent for the second stage adsorption unit 112 or the adsorbent for the adsorption unit 212 can be achieved even at 298 K (25° C.). In this manner, a reduced operational cost with respect to heating the air feed 142 or the air feed 242 can be expected.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method for sulfur recovery, the method comprising the steps of:

feeding a tail gas stream to a hydrogenation reactor to produce a hydrogenated gas stream by converting sulfur-containing compounds to hydrogen sulfide, wherein the tail gas stream includes a Claus tail gas comprising the sulfur-containing compounds, wherein the hydrogenated gas stream comprises hydrogen sulfide, water, and at least one of: carbon dioxide and nitrogen, wherein the hydrogenated gas stream is in the absence of the sulfur-containing compounds other than hydrogen sulfide;

feeding the hydrogenated gas stream to a quench tower to produce a quenched gas stream by condensing and recovering liquid water via a water condensate stream, wherein the quenched gas stream comprises hydrogen sulfide and at least one of: water, carbon dioxide, and nitrogen;

feeding the quenched gas stream to a first stage adsorption unit to produce a first outlet gas stream by separating water via a first byproduct stream from hydrogen sulfide, carbon dioxide, and nitrogen, wherein the first outlet gas stream comprises hydrogen sulfide and at least one of: carbon dioxide and nitrogen, wherein the first outlet gas stream is in the absence of water; and feeding the first outlet gas stream to a second stage adsorption unit to produce a second outlet gas stream by separating carbon dioxide and nitrogen via a second byproduct stream, wherein the second outlet gas stream comprises hydrogen sulfide, wherein the second outlet gas stream is in the absence of carbon dioxide and nitrogen.

2. The method of claim 1, further comprising the step of: heating the tail gas stream to a first temperature ranging between 240° C. and 260° C.

3. The method of claim 1, further comprising the step of: cooling the quenched gas stream to a second temperature ranging between 15° C. and 30° C.

4. The method of claim 1, further comprising the step of: cooling the first outlet gas stream to a third temperature ranging between 15° C. and 30° C.

5. The method of claim 1, wherein the first stage adsorption unit comprises at least three first adsorption vessels fluidly connected in parallel such that a continuous flow of the first outlet gas stream is provided by having one of the at least three first adsorption vessels in an adsorption cycle, one of the at least three first adsorption vessels in a regeneration cycle, and one of the at least three first adsorption vessels in a standby cycle.

6. The method of claim 1, wherein the first stage adsorption unit comprises a first adsorption vessel including a first adsorbent, wherein the first adsorbent adsorbs hydrogen sulfide, carbon dioxide, and nitrogen while passes water to form the first byproduct stream during an adsorption cycle.

7. The method of claim 6, wherein the first adsorbent comprises an all-silica zeolite having a framework selected from the group consisting of: MFI, CHA, and combinations of the same.

8. The method of claim 6, further comprising the step of: introducing an air feed to the first stage adsorption unit during a regeneration cycle such that hydrogen sulfide, carbon dioxide, and nitrogen desorbs from the first adsorbent to form the first outlet gas stream.

9. The method of claim 1, wherein the first stage adsorption unit comprises a first adsorption vessel including a first adsorbent, wherein the first adsorbent adsorbs water while passes hydrogen sulfide, carbon dioxide, and nitrogen to form the first outlet gas stream during an adsorption cycle.

10. The method of claim 9, wherein the first adsorbent comprises a hydrophilic 3Å molecular sieve.

11. The method of claim 9, further comprising the step of: introducing an air feed to the first stage adsorption unit during a regeneration cycle such that water desorbs from the first adsorbent to form the first byproduct stream.

12. The method of claim 1, wherein the second stage adsorption unit comprises at least three second adsorption vessels fluidly connected in parallel such that a continuous flow of the second outlet gas stream is provided by having one of the at least three second adsorption vessels in an adsorption cycle, one of the at least three second adsorption vessels in a regeneration cycle, and one of the at least three second adsorption vessels in a standby cycle.

13. The method of claim 1, wherein the second stage adsorption unit comprises a second adsorption vessel including a second adsorbent, wherein the second adsorbent adsorbs hydrogen sulfide while passes carbon dioxide and nitrogen to form the second byproduct stream during an adsorption cycle.

14. The method of claim 13, wherein the second adsorbent comprises a zeolite having a framework selected from the group consisting of: MFI, CHA, FAU, MOR, DDR, FER, MWW, MOF, ZIF, and combinations of the same.

15. The method of claim 13, further comprising the step of:
introducing an air feed to the second stage adsorption unit during a regeneration cycle such that hydrogen sulfide desorbs from the second adsorbent to form the second outlet gas stream.

16. The method of claim 1, further comprising the step of: feeding the second outlet gas stream to a Claus unit.

17. A Claus tail gas treatment system for sulfur recovery, the Claus tail gas treatment system comprising:
a hydrogenation reactor, the hydrogenation reactor configured to receive a Claus tail gas and to convert sulfur-containing compounds to hydrogen sulfide such that a hydrogenated gas stream is produced, wherein the Claus tail gas comprises the sulfur-containing compounds, wherein the hydrogenated gas stream comprises hydrogen sulfide, water, and at least one of: carbon dioxide and nitrogen, wherein the hydrogenated gas stream is in the absence of the sulfur-containing compounds other than hydrogen sulfide;
a quench tower, the quench tower fluidly connected downstream of the hydrogenation reactor to receive the hydrogenated gas stream, the quench tower configured to condense and recover liquid water via a water condensate stream and to produce a quenched gas stream, wherein the quenched gas stream comprises hydrogen sulfide and at least one of: water, carbon dioxide, and nitrogen;
a first stage adsorption unit, the first stage adsorption unit fluidly connected downstream of the quench tower to receive the quenched gas stream, the first stage adsorption unit configured to separate water via a first byproduct stream from hydrogen sulfide, carbon dioxide, and nitrogen to produce a first outlet gas stream, wherein the first outlet gas stream comprises hydrogen sulfide and at least one of: carbon dioxide and nitrogen, wherein the first outlet gas stream is in the absence of water; and
a second stage adsorption unit, the second stage adsorption unit fluidly connected downstream of the first stage adsorption unit to receive the first outlet gas stream, the second stage adsorption unit configured to separate carbon dioxide and nitrogen via a second byproduct stream to produce a second outlet gas stream, wherein the second outlet gas stream comprises hydrogen sulfide, wherein the second outlet gas stream is in the absence of carbon dioxide and nitrogen.

18. The Claus tail gas treatment system of claim 17, further comprising:
a heater, the heater fluidly connected upstream of the hydrogenation reactor, the heater configured to heat the Claus tail gas to a first temperature ranging between 240° C. and 260° C.

19. The Claus tail gas treatment system of claim 17, further comprising:
a first cooler, the first cooler fluidly connected downstream of the quench tower and fluidly connected upstream of the first stage adsorption unit, the first cooler configured to cool the quenched gas stream to a second temperature ranging between 15° C. and 30° C.

20. The Claus tail gas treatment system of claim 17, further comprising:

a second cooler, the second cooler fluidly connected downstream of the first stage adsorption unit and fluidly connected upstream of the second stage adsorption unit, the second cooler configured to cool the first outlet gas stream to a third temperature ranging between 15° C. and 30° C.

21. The Claus tail gas treatment system of claim 17, wherein the first stage adsorption unit and the second stage adsorption unit are configured to receive an air feed during a regeneration cycle to desorb molecules adsorbed to an adsorbent in an adsorption cycle.

22. The Claus tail gas treatment system of claim 17, wherein the first stage adsorption unit comprises at least three first adsorption vessels fluidly connected in parallel such that a continuous flow of the first outlet gas stream is provided by having one of the at least three first adsorption vessels in an adsorption cycle, one of the at least three first adsorption vessels in a regeneration cycle, and one of the at least three first adsorption vessels in a standby cycle.

23. The Claus tail gas treatment system of claim 17, wherein the first stage adsorption unit comprises a first adsorption vessel including a first adsorbent, wherein the first adsorbent is configured to adsorb hydrogen sulfide, carbon dioxide, and nitrogen while passing water to form the first byproduct stream during an adsorption cycle.

24. The Claus tail gas treatment system of claim 23, wherein the first adsorbent comprises an all-silica zeolite having a framework selected from the group consisting of: MFI, CHA, and combinations of the same.

25. The Claus tail gas treatment system of claim 17, wherein the first stage adsorption unit comprises a first adsorption vessel including a first adsorbent, wherein the first adsorbent is configured to adsorb water while passing hydrogen sulfide, carbon dioxide, and nitrogen to form the first outlet gas stream during an adsorption cycle.

26. The Claus tail gas treatment system of claim 25, wherein the first adsorbent comprises a hydrophilic 3Å molecular sieve.

27. The Claus tail gas treatment system of claim 17, wherein the second stage adsorption unit comprises at least three second adsorption vessels fluidly connected in parallel such that a continuous flow of the second outlet gas stream is provided by having one of the at least three second adsorption vessels in an adsorption cycle, one of the at least three second adsorption vessels in a regeneration cycle, and one of the at least three second adsorption vessels in a standby cycle.

28. The Claus tail gas treatment system of claim 17, wherein the second stage adsorption unit comprises a second adsorption vessel including a second adsorbent, wherein the second adsorbent is configured to adsorb hydrogen sulfide while passing carbon dioxide and nitrogen to form the second byproduct stream during an adsorption cycle.

29. The Claus tail gas treatment system of claim 28, wherein the second adsorbent comprises a zeolite having a framework selected from the group consisting of: MFI, CHA, FAU, MOR, DDR, FER, MWW, MOF, ZIF, and combinations of the same.

30. The Claus tail gas treatment system of claim 17, wherein the second outlet gas stream is fluidly connected upstream of a Claus unit.

* * * * *